(12) United States Patent
Ware

(10) Patent No.: US 6,976,114 B1
(45) Date of Patent: Dec. 13, 2005

(54) METHOD AND APPARATUS FOR SIMULTANEOUS BIDIRECTIONAL SIGNALING IN A BUS TOPOLOGY

(75) Inventor: Frederick A. Ware, Los Altos, CA (US)

(73) Assignee: Rambus Inc., Los Altos, CA (US)

( * ) Notice: Subject to any disclaimer, the term of this patent is extended or adjusted under 35 U.S.C. 154(b) by 469 days.

(21) Appl. No.: 09/770,996

(22) Filed: Jan. 25, 2001

(51) Int. Cl.[7] .......................... G06F 13/14; H03K 17/16
(52) U.S. Cl. ........................ 710/305; 710/21; 710/106; 326/30
(58) Field of Search .................. 710/310, 311, 313, 710/314, 315, 100, 305, 104, 105, 106, 107, 710/110, 302, 306, 57; 375/257; 326/20, 326/41, 82, 30; 365/198; 327/165

(56) References Cited

U.S. PATENT DOCUMENTS

| | | | | |
|---|---|---|---|---|
| 4,309,755 A | * | 1/1982 | Lanty | 710/21 |
| 5,003,463 A | * | 3/1991 | Coyle et al. | 710/57 |
| 5,514,983 A | * | 5/1996 | Yoshino | 326/86 |
| 5,530,814 A | * | 6/1996 | Wong et al. | 710/317 |
| 5,604,450 A | * | 2/1997 | Borkar et al. | 326/82 |
| 5,742,798 A | | 4/1998 | Goldrian | |
| 5,872,471 A | * | 2/1999 | Ishibashi et al. | 327/98 |
| 6,127,849 A | * | 10/2000 | Walker | 326/86 |
| 6,301,629 B1 | * | 10/2001 | Sastri et al. | 710/305 |
| 6,377,492 B1 | * | 4/2002 | Rong et al. | 365/189.02 |
| 6,457,078 B1 | * | 9/2002 | Magro et al. | 710/105 |
| 6,493,394 B2 | * | 12/2002 | Tamura et al. | 375/257 |
| 6,516,365 B2 | * | 2/2003 | Horowitz et al. | 710/104 |
| 6,687,780 B1 | * | 2/2004 | Garlepp et al. | 710/305 |

FOREIGN PATENT DOCUMENTS

JP          02000035831 A     2/2000

\* cited by examiner

*Primary Examiner*—Khanh Dang
(74) *Attorney, Agent, or Firm*—Hunton & Williams LLP

(57) ABSTRACT

A method and apparatus for providing bidirectional signaling in a bus topology is provided. The bus topology allows more than two electrical circuits or devices to be coupled together along one or more common electrical conductors. For each device on the bus, a transmit buffer is preferably provided for every other device on the bus with which it will communicate. One or more logic circuits, for example, a scheduler, is provided to coordinate exchange transactions between pairs of devices. Time delays are preferably provided between exchange transactions of different device pairs so as to prevent interference. Coherency checking is preferably implemented to avoid discrepancies introduced by information being held in a buffer pending an exchange transaction. Devices coupled to a common bus preferably maintain a transmit buffer for each other device on the bus with which they will be communicating. When one of the transmit buffers for communicating between a pair of devices contains an amount of data, that pair of devices is granted an exchange slot on the bus that provides a period of time during which the pair of devices may conduct their exchange transaction and communicate with each other over the bus. During the exchange slot, the pair of devices transfer information from their transmit buffers across the bus to receive buffers of the opposite device. Different exchange slots are used for different pairs of devices.

39 Claims, 11 Drawing Sheets

METHOD AND APPARATUS FOR SIMULTANEOUS BIDIRECTIONAL SIGNALING IN A BUS TOPOLOGY

TECHNICAL FIELD OF THE INVENTION

The invention relates generally to data processing and data communication and, more specifically, to exchange of data between devices coupled to a bus.

BACKGROUND OF THE INVENTION

As computers and data processing equipment have grown in capability, users have developed applications that place increasing demands on the equipment. Thus, there is a continually increasing need to process more information in a given amount of time. Computers and data processing equipment include electronic circuits coupled to each other by electrical conductors. The various electrical circuits perform various tasks in the processing of information, and the electrical conductors allow signals representing information to be passed between the electrical circuits to allow processing of the information to be completed.

Traditionally, digital signals having two voltage levels, one voltage level to represent a binary zero and another voltage level to represent a binary one, have been used to communicate information between electronic circuits. To avoid interference, the electrical conductors have traditionally been constrained to pass a single voltage level, representing one bit of information, in one direction at any given point in time. Given this constraint, attempts to increase the amount of information processed per unit time have generally involved either increasing the number of electrical conductors so that several bits of information can be processed in parallel and increasing the rate at which the signals are transmitted over the electrical conductor.

The results of the efforts to process more bits of information in parallel can be seen in the increasing bus widths of modern computers and data processing equipment. The result of efforts to increase the rate at which signals are transmitted over an electrical conductor can be seen in the increasing clock frequency of modern computers and data processing equipment. Efforts to continue increasing the amount of information that can be processed in a given amount of time are hindered buy the difficulties of fabricating large numbers of parallel electrical conductors of microscopic dimensions that reliably pass signals at high frequencies, for example, frequencies extending into the microwave region of the spectrum. Thus, a technique is needed to increase the rate at which information can be processed without relying merely on increasing bus width or increasing frequency.

DETAILED DESCRIPTION OF A PREFERRED EMBODIMENT

Figure 1:
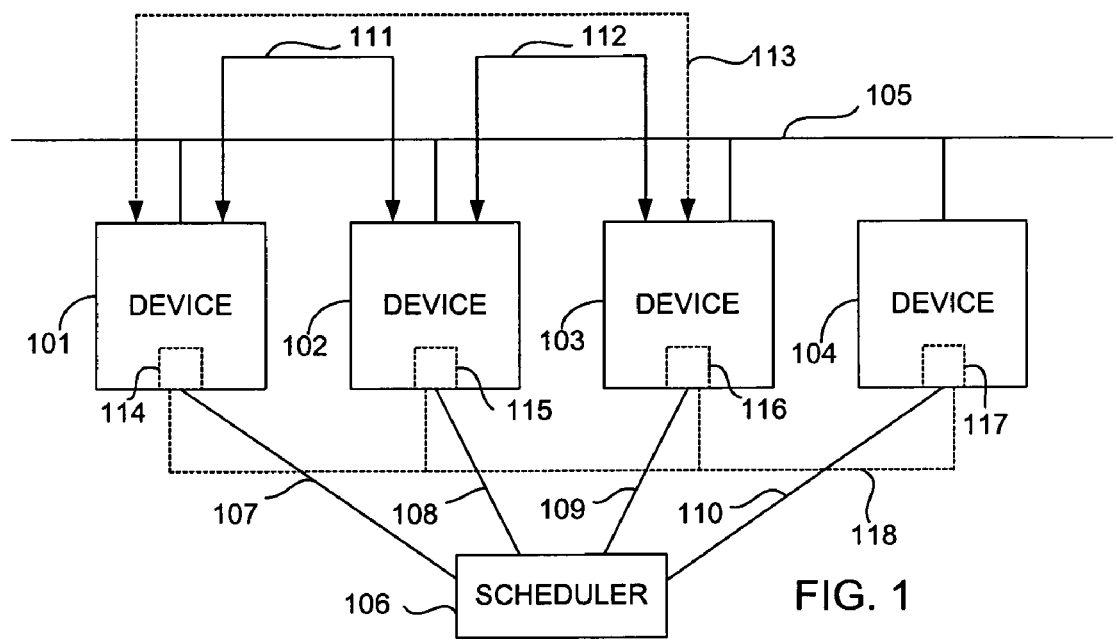
FIG. 1 is a block diagram illustrating one embodiment of a system in accordance with an embodiment of the invention.

A method and apparatus for providing bidirectional signaling in a bus topology is described. The bus topology allows more than two electrical circuits or devices to be coupled together along one or more common electrical conductors, with a bus comprising these one or more electrical conductors. For each device on the bus, a transmit buffer is preferably provided for every other device on the bus with which it will communicate. One or more logic circuits, for example, a scheduler, is provided to coordinate exchange transactions between pairs of devices. In accordance with an embodiment of the present invention, time delays are provided between exchange transactions of different device pairs so as to prevent interference. Coherency checking is preferably implemented to avoid discrepancies introduced by information being held in a buffer pending an exchange transaction.

Devices coupled to a common bus maintain a transmit buffer for each other device on the bus with which they will be communicating. When one of the transmit buffers for communicating between a pair of devices contains an amount of data to be transmitted over the bus, that pair of devices is granted an exchange slot on the bus in which the pair of devices may communicate with each other. The exchange slot provides a period of time during which the pair of devices may conduct their exchange transaction and communicate with each other over the bus. During the exchange slot, the pair of devices transfer information from their transmit buffers across the bus to receive buffers of the opposite device. Different exchange slots are granted for different pairs of devices.

Turnaround delays are observed before another device pair is granted an exchange slot to prevent inter-exchange interference. Turnaround delays allow time for signals present on the bus from the transaction of the previous exchange slot to disappear from the bus before the next exchange slot begins. The signals may disappear from the bus during the turnaround delays by propagating along the bus until they reach a terminator coupled to the bus. To maintain high efficiency, the turnaround delay is preferably short relative to the duration of an exchange slot, and the size of the transmit buffers in the pair of devices is preferably as close to equal as possible. Also, for high efficiency, the rate of transfers from a first device to a second device is preferably as close as possible to the transfer rate from the second device to the first device. Preferably, the turnaround delay is less than twice the end-to-end propagation delay of the bus. The propagation delay of the bus may be determined by dividing the bus length by the propagation velocity of the signals. The propagation velocity is a function of the speed of light and the dielectric constant associated with the bus.

One embodiment of the invention may be applied to a memory controller and one or more memory devices coupled by a bus. The transmit buffers of the memory controller are a set of write buffers, one for each memory device. When a read operation from a memory device is scheduled, the write buffer and the memory controller corresponding to that memory device is allowed to transfer its write data to the memory device in the same exchange slot during which the memory device is providing its read data for the read operation to the memory controller.

One technique presented in patent application Ser. No. 09/478,916, filed on Jan. 6, 2000, and assigned to the assignee of the present application, and which is incorporated herein by reference, provides the ability to send signals in opposite directions along an electrical conductor between two devices coupled to the electrical conductor. This technique uses additive signaling by driving the bus using current mode drivers. Low distortion of the transmitted signals is ensured by controlling the impedance of the electrical conductor. Low inter-symbol interference of sequentially transmitted signals is obtained by providing termination of proper impedance at each end of the electrical conductor.

Receivers for each device are provided with an analog subtraction function that allows subtracting the signal transmitted by that device from the signal present on the bus at that device so as to obtain the signal received from the opposite device. Source synchronous clocking is used to avoid clock skew based on the position of the devices along the electrical conductor. Because of the difficulty of extracting the two signals being communicated over the electrical conductor by a third device coupled to the electrical conductor at a different location using clock sampling techniques, this technique is limited to bidirectional signaling in a point-to-point topology having only two devices coupled to the electrical conductor. The present invention overcomes this limitation and allows bidirectional signaling in a bus topology, where more than two devices may be coupled to the electrical conductor FIG. 1 is a block diagram illustrating one embodiment of a system in accordance with an embodiment of the invention. The system includes device 101, device 102, device 103, device 104, bus 105, and scheduler 106. Devices 101, 102, 103, and 104 are coupled to bus 105. Bus 105 may include a single conductor or a plurality of conductors.

In one embodiment, scheduler 106 is in communication with each of devices 101, 102, 103, and 104. Scheduler 106 is coupled to device 101 via coupling 107. Scheduler 106 is coupled to device 102 via coupling 108. Scheduler 106 is coupled to device 103 via coupling 109. Scheduler 106 is coupled to device 104 via coupling 110. Devices 101, 102, 103, and 104 provide indications to scheduler 106 of information to be exchanged between devices 101, 102, 103, and 104. Scheduler 106 monitors devices 101, 102, 103, and 104, and, when one device has an amount of information to exchange with another device, scheduler 106 allocates an exchange slot on bus 105 over which the information may be exchanged. The exchange slot may be a time slot, for example, a period of time during which a given pair of devices may exchange information over bus 105. Thus, scheduler 106 operates as a common scheduler that is common to the plurality of devices and that schedules exchanges between pairs of devices on bus 105.

In one embodiment, scheduling capability may be provided by cooperative schedulers associated with their respective devices. For example, cooperative schedulers 114, 115, 116, and 117 are associated with devices 101, 102, 103, and 104 respectively. Cooperative schedulers 114, 115, 116, and 117 are coupled by coupling 118 and communicate with each other via coupling 118 to schedule exchanges between pairs of devices on bus 105. Cooperative schedulers 114, 115, 116, and 117 may monitor devices 101, 102, 103, and 104, respectively, to determine when a device has an amount of information to be communicated to another device. When information is to be communicated to the other device, cooperative schedulers 114, 115, 116, and 117 schedule a pair selected from among devices 101, 102, 103, and 104 to exchange information. Cooperative schedulers 114, 115, 116, and 117 allocate an exchange slot for the selected pair of devices to exchange information via bus 105.

If the device is equipped with a transmit buffer to hold information to be communicated with another device, an amount of information that is to be accumulated in the transmit buffer before an exchange slot is allocated may be specified. The amount of information may be that amount of information that would completely fill the transmit buffer or a lesser amount of information. Withholding an exchange slot until the specified amount of information is accumulated in the transmit buffer ensures that the exchange will include the specified minimum amount of information, which can increase efficiency by maintaining a certain amount of information exchange for a given amount of scheduling overhead. Other considerations may also be included in the scheduling process. For example, a timer may be used to ensure that scheduling occurs within a certain amount of time after information is placed in the transmit buffer to facilitate timely communication of information even if the specified minimum amount of information is not placed in the transmit buffer within the specified amount of time.

As an example, when device 101 has an amount of information to be communicated to device 102, a scheduler, for example, common scheduler 106 or cooperative schedulers 114, 115, 116, and 117, may schedule an exchange slot for bus 105 to allow exchange 111 to occur. During exchange 111, device 101 transmits information destined for device 102, while device 102 simultaneously transmits information destined for device 101. The information from both of devices 101 and 102 is present on bus 105 simultaneously. Device 102 receives the information from device 101, and device 101 simultaneously receives the information from device 102. Once exchange 111 is completed, bus 105 is available for other devices to be scheduled to communicate.

For example, if device 103 has an amount of information to be communicated to device 102, the scheduler schedules an exchange slot for bus 105 to allow exchange 112 to occur. During exchange 112, device 103 transmits information destined for device 102, while device 102 simultaneously transmits information destined for device 103. The information from both of devices 102 and 103 is present on bus simultaneously. Device 102 receives the information from device 103, and device 103 simultaneously receives the information from device 102. Once exchange 112 is completed, bus 105 is available for other devices to be scheduled to communicate. For example, exchange 113 between device 101 and device 103 may be scheduled to occur.

As an example of how the system of FIG. 1 may be implemented, a system for bidirectional communication of data over a common bus may include a first device, a second device, a third device, and a scheduler, each operably coupled to the common bus. The first device comprises a first-to-second transmit buffer to hold first-to-second data and a first-to-third transmit buffer to hold first-to-third data. The second device comprises a second-to-first transmit buffer to hold second-to-first data. The third device comprises a third-to-first transmit buffer to hold third-to-first data. The scheduler schedules the first device to transmit the first-to-second data and the second device to transmit the second-to-first data over the common bus during a first exchange slot. The scheduler schedules the first device to transmit the first-to-third data and the third device to transmit the third-to-first data over the common bus during a second exchange slot. The scheduler also introduces a turnaround delay sufficient to prevent inter-symbol interference between the first exchange slot and the second exchange slot.

Figure 2:
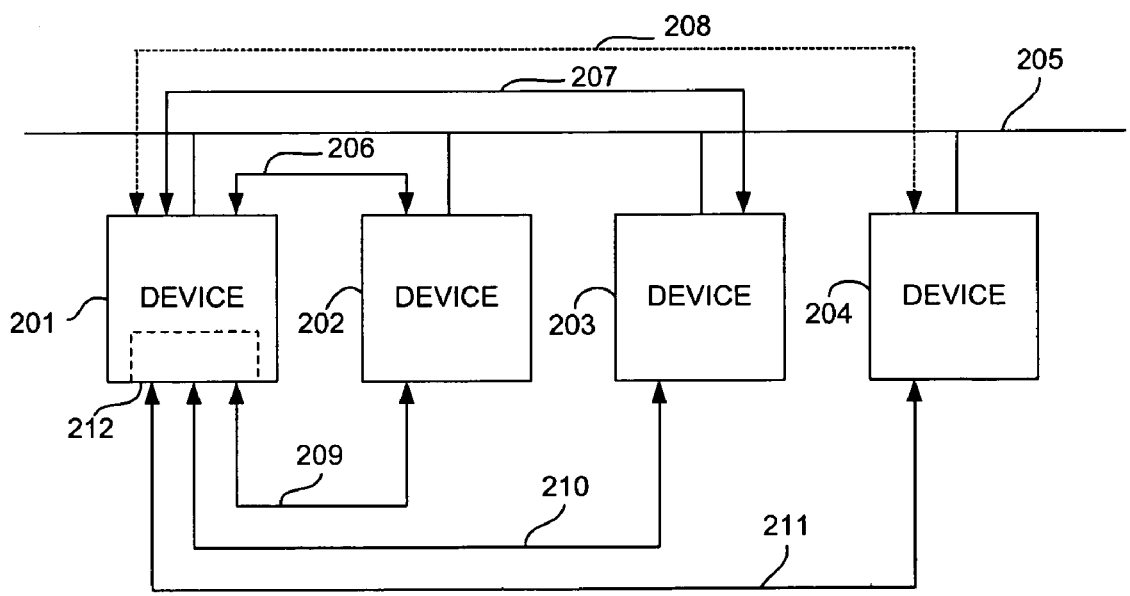
FIG. 2 is a block diagram illustrating one embodiment of a system in accordance with the invention.

FIG. 2 is a block diagram illustrating one embodiment of a system in accordance with the invention. The system includes devices 201, 202, 203, and 204, as well as bus 205. Devices 201, 202, 203, and 204 are coupled to one another via bus 205. Scheduler 212 is associated with device 201. Scheduler 212 is coupled to device 201 and may, for example, be incorporated into device 201. Scheduler 212 is coupled to device 202 via coupling 209. Scheduler 212 is coupled to device 203 via coupling 210. Scheduler 212 is coupled to device 204 via coupling 211. Devices 201, 202, 203, and 204 provide scheduler with indications of information to be communicated between the devices. Scheduler 212 schedules exchanges of information between the devices. For example, scheduler 212 may schedule an exchange 206 of information between device 201 and device 202, an exchange 207 of information between device 201 and device 203, and/or an exchange 208 of information between device 201 and device 204. These exchanges occur over bus 205.

One example of an instance where FIG. 2 may be implemented is where device 201 is a memory controller and devices 202, 203, and 204 are memory devices. In such a system, information is exchanged between the memory controller and one of the memory devices during a first exchange slot and between the memory controller and another of the memory devices during a second exchange slot.

Figure 3:
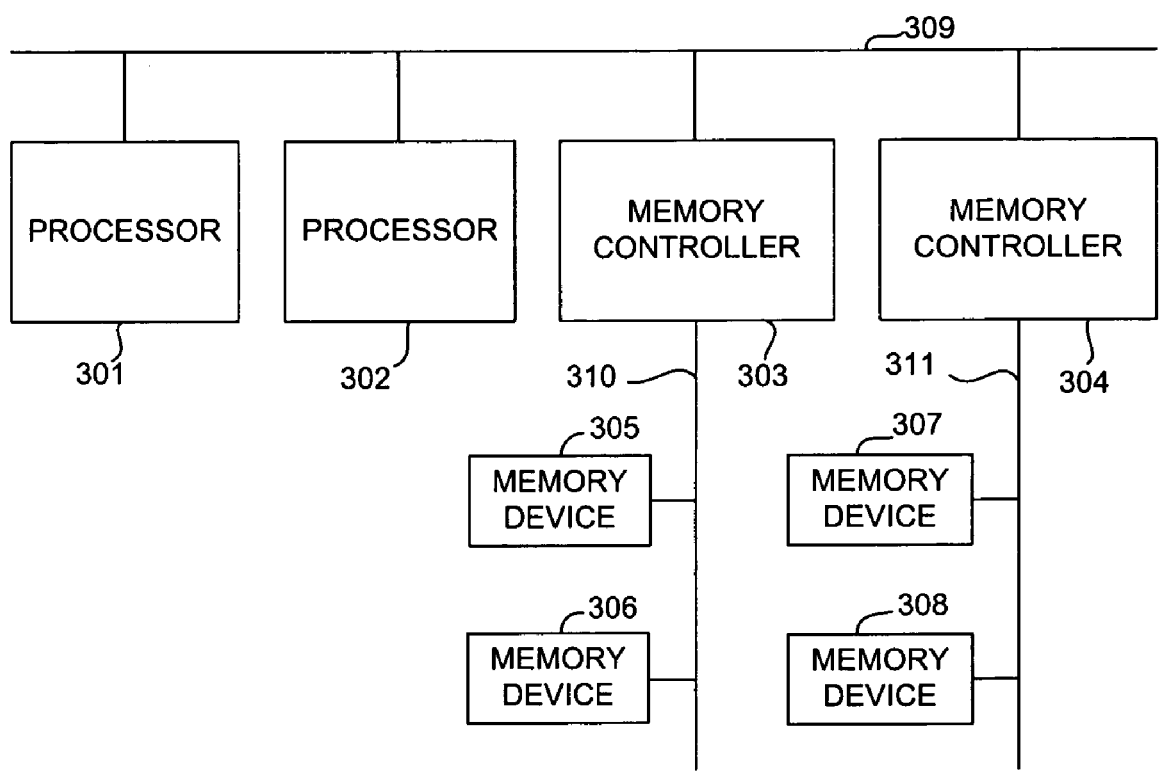
FIG. 3 is a block diagram illustrating one embodiment of a memory system in accordance with an embodiment of the invention.

FIG. 3 is a block diagram illustrating one embodiment of a memory system in accordance with an embodiment of the invention. The system includes processor 301, processor 302, memory controller 303, memory controller 304, memory device 305, memory device 306, memory device 307, and memory device 308. Processor 301, processor 302, memory controller 303, and memory controller 304 are coupled to system bus 309. Memory controller 303, memory device 305, and memory device 306 are coupled to memory bus 310. Memory controller 304, memory device 307, and memory device 308 are coupled to memory bus 311.

While two processors, two memory controller, and two memory devices per memory controller are illustrated, this embodiment of the invention may be practiced with any number of processors, memory controllers, and memory devices. The invention may be used to schedule simultaneous bidirectional communication of information between memory controller 303 and either of memory devices 305 and 306 over memory bus 310, between memory controller 304 and either of memory devices 307 and 308 over memory bus 311, and/or between either of processors 301 and 302 and either of memory controllers 303 and 304 over system bus 309.

When the invention is applied to a memory controller and memory devices, write data may be transmitted from the memory controller to a memory device at the same time that read data are transmitted from the memory device to the memory controller. For example, during a first exchange slot, a first memory device may send first read data to the memory controller while simultaneously receiving first write data from the memory controller. During a second exchange slot, a second memory device may send second read data to the memory controller while simultaneously receiving second write data from the memory controller.

In one embodiment, the bus comprises a conductor that operably couples the first memory device and the second memory device to the memory controller. The first memory device can simultaneously send a read bit of read data to the memory controller over the conductor and receive a write bit of write data from the memory controller over the conductor during a first exchange slot. The second memory device can simultaneously send a read bit of read data to the memory controller over the conductor and receive a write bit of write data from the memory controller over the conductor during a second exchange slot.

The memory controller preferably performs coherency checking during memory access operations. For example, if the memory controller receives a request for a memory read operation, the memory controller preferably checks its write buffer corresponding to the memory device to which the memory read operation is addressed. If the write buffer is holding information destined for the memory location in the memory device corresponding to the address of the memory read operation, the memory controller reconciles the potential difference between the information stored in the write buffer and the information stored in the memory device and provides accurate information in response to the request for the memory read operation. For example, the memory controller may provide the information stored in the write buffer in response to the request for the memory read operation rather than actually reading the designated memory location. The memory location is then updated in due course when the information stored in the write buffer of the memory controller is transmitted to the memory device.

In typical memory systems, a read operation can immediately follow a write operation without delay, but a write operation following a read operation must be delayed at least one clock cycle. This results from the time required for control signals to be transmitted from the memory controller to the memory device to initiate a memory read operation followed sequentially by the time for the read data to be transmitted from the memory device to the memory controller. By comparison, for a memory write operation, the time required for the transmission of control signals and the time required for the transmission of write data can occur concurrently. The present invention may be used to avoid the need for a read-to-write delay. Not only does the present invention allow this delay to be avoided, but it also allows the effective data rate of the bus to be doubled without requiring an increase in the bus frequency. Moreover, this doubling of the effective data rate of the bus is accomplished using only three levels of voltage, thereby minimally increasing the voltage discrimination of receivers in devices coupled to the bus.

To further improve performance, read and write operations, while occurring in the same exchange slot, may be skewed slightly to reduce the turnaround delay. The skew may be introduced in increments of a clock cycle. The timing of the write data may be delayed to match the timing of the read data. This may be accomplished by a write buffer of the memory controller. The skew may be introduced as a function of the physical location of the memory devices relative to the physical location of the memory controller (i.e., as a function of device position). The skew may also be selectively introduced if the read and write transfer sizes are different. The skew may also be introduced if one of the exchange slots is unused.

Figure 4:
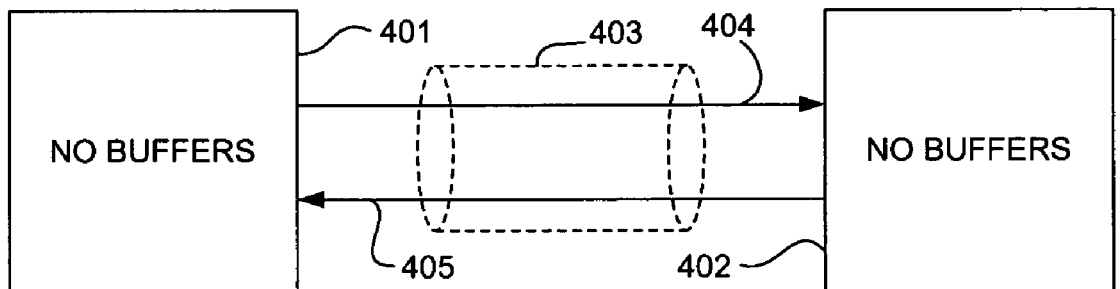
FIG. 4 is a block diagram illustrating one embodiment of a pair of devices coupled by a conductor in accordance with an embodiment of the invention.

Read and write command lines that carry control signals for memory access operations are typically separate. However, time multiplexing may be used to increase the efficiency of the communication of control signals for memory access operations. For example, read control signals and write control signals may be assigned alternating time slots. Consequently, the need for separate read and write command lines could be obviated, FIG. 4 is a block diagram illustrating one embodiment of a pair of devices coupled by a conductor in accordance with an embodiment of the invention. Device 401 is coupled to device 402 via conductor 403. Devices 401 and 402 may be any of several devices coupled to a bus comprising conductor 403. Different pairs of devices may be scheduled to communicate with each other during different exchange slots on the bus. In this embodiment, neither device 401 nor device 402 has a transmit buffer. Rather, the scheduling of exchange slots takes into account the times at which the devices will have information to communicate with each other and schedules exchange slots to utilize conductor 403 accordingly. During the exchange slot, device 401 transmits information over conductor 403 to device 402 via 404, while, at the same time, device 402 transmits information over conductor 403 to device 401 via 405.

Figure 5:
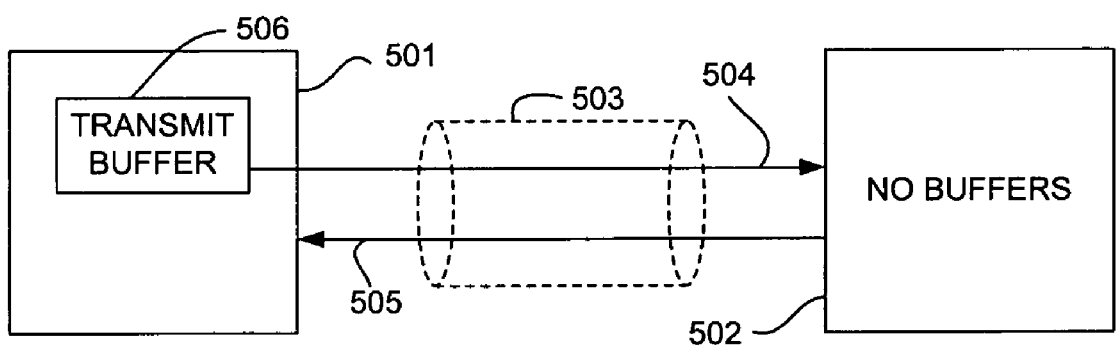
FIG. 5 is a block diagram illustrating one embodiment of a pair of devices coupled by a conductor in accordance with an embodiment of the invention.

FIG. 5 is a block diagram illustrating one embodiment of a pair of devices coupled by a conductor in accordance with an embodiment of the invention. Device 501 is coupled to device 502 via conductor 503. Devices 501 and 502 may be any of several devices coupled to a bus comprising conductor 503. Different pairs of devices may be scheduled to communicate with each other during different exchange slots on the bus. In this embodiment, device 501 includes transmit buffer 506, while device 502 does not have a transmit buffer.

Scheduling of an exchange slot to allow communication between device 501 and device 502 via conductor 503 may occur in two ways. Firstly, an exchange slot may be scheduled based on the availability of information in transmit buffer 506 destined for device 502. The exchange slot may be scheduled upon receipt of any information into transmit buffer 506, upon receipt of a specified amount of information into transmit buffer 506, or on other conditions, for example, after some amount of time has elapsed since information was received into transmit buffer 506. The availability of the bus in the absence of any other allotted exchange slots may also be considered in scheduling exchange slots. Secondly, an exchange slot may be scheduled to occur when device 502 will have information ready to communicate to device 501.

As an example, the configuration of FIG. 5 may be applied to a memory system including a memory controller and memory devices, such as the memory system illustrated in FIG. 3 or the system illustrated in FIG. 2 if device 201 is a memory controller and devices 202, 203, and 204 are memory devices. Since it is often desirable to read information from a memory device without substantial delay after the information is requested, memory devices may be implemented as device 502, without the need for transmit buffers. However, information to be written to a memory device may be held in an writeback buffer for substantial periods of time without adverse effects.

One manner in which the embodiments of FIGS. 4 and 5 may be applied to memory systems comprising a memory controller and memory devices is through the use of memory devices having separate banks of memory, one or more of which may be involved in a read operation while another one or more of which are involved in a write operation. Such segregation of memory resources is one way to avoid providing buffers in a memory device.

Memory coherency checking is performed to ensure that accurate information is maintained for memory locations whose contents are subject to change. Accurate information is maintained by keeping track of the most current information for each memory location even when various versions of information for a particular memory location may exist in different places, for example, in the writeback buffer and in the memory device itself. The writeback buffer is consulted when subsequent memory read or write operations are performed to ensure that relevant information for a particular memory location being held in the writeback buffer pending writeback to the memory device supersedes information stored at a similar memory location in the memory device.

Thus, information to be written to a memory device implemented as device 502 may be held in transmit buffer 506 of a memory controller implemented as device 501 until information is desired to be read from device 502. When information is desired to be read from device 502, an exchange slot is scheduled for communication along a bus comprising conductor 503 between device 501 and device 502. During the exchange slot, the desired information is read from device 502 and transmitted to device 501 via 505, and, at the same time, information being held in transmit buffer 506 is transmitted to device 502 via 504.

Therefore, as compared with a system where only unidirectional communication may occur over the bus at any given time, bus can be essentially freed for other use during the time that would otherwise have been spent writing information from a memory controller to memory devices. Consequently, memory read operations and memory write operations can be performed without tying up the bus for more time than would be required just to perform the memory read operations in a system providing only unidirectional bus communication at a given time. While situations where the amount of information being written to memory exceeds the amount of information being read from memory may naturally require more time using the bus than would be required for only the memory read operations, still this embodiment of the invention provides substantially increased efficiency for memory operations.

Figure 6:
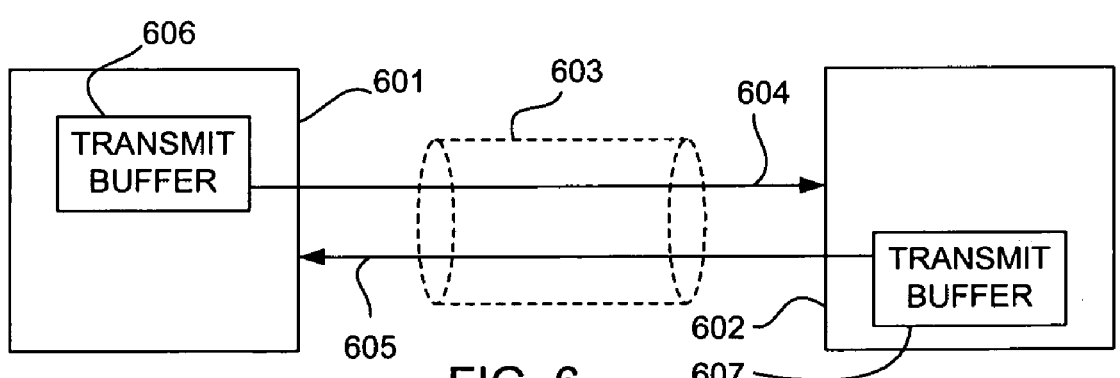
FIG. 6 is a block diagram illustrating a pair of devices coupled by a conductor in accordance with an embodiment of the invention.

FIG. 6 is a block diagram illustrating a pair of devices coupled by a conductor in accordance with an embodiment of the invention. Device 601 is coupled to device 602 via conductor 603. Devices 601 and 602 may be any of several devices coupled to a bus comprising conductor 603. Different pairs of devices may be scheduled to communicate with each other during different exchange slots on the bus. In this embodiment, device 601 includes transmit buffer 606, and device 602 includes transmit buffer 607. Thus, information to be communicated from device 601 to device 602 may be stored in transmit buffer 606 pending an exchange slot to allow such communication. Likewise, information to be communicated from device 602 to device 601 may be stored in transmit buffer 607 pending the exchange slot.

When an amount of information to be transmitted is received in either transmit buffer 606 or transmit buffer 607 such that any specified criteria for requesting an exchange slot are met, an exchange slot is requested. A scheduler, which may, for example, be a common scheduler or cooperative schedulers, allocates an exchange slot for devices 601 and 602 to use a bus comprising conductor 603. During the exchange slot, device 601 transmits the information from transmit buffer 606 destined for device 602 to device 602 over conductor 603. When an amount of information to be transmitted is received in either transmit buffer 606 or transmit buffer 607 such that any specified criteria for requesting an exchange slot are met, an exchange slot is requested. A scheduler, which may, for example, be a common scheduler or cooperative schedulers, allocates an exchange slot for devices 601 and 602 to use a bus comprising conductor 603. During the exchange slot, device 601 transmits the information from transmit buffer 606 destined for device 602 to device 602 over conductor 603. At the same time, device 602 transmits the information from transmit buffer 607 destined for device 601 to device 601 over conductor 603 via 604. At the same time, device 602 transmits the information from transmit buffer 607 destined for device 601 to device 601 over conductor 603 via 605.

While it is possible to use a single transmit buffer within each device or fewer transmit buffers within each device than the number other devices coupled to the bus, it is preferable to provide for each device on the bus a dedicated transmit buffer for each other device on the bus with which the given device will exchange information. Thus, each device on the bus preferably contains at least as many transmit buffers as the number of other devices on the bus with which the given device will exchange information over the bus. By providing dedicated transmit buffers, the amount of information stored in each dedicated transmit buffer may be used to determine the optimum scheduling of exchange slots among the various pairs of devices on the bus.

Figure 7:
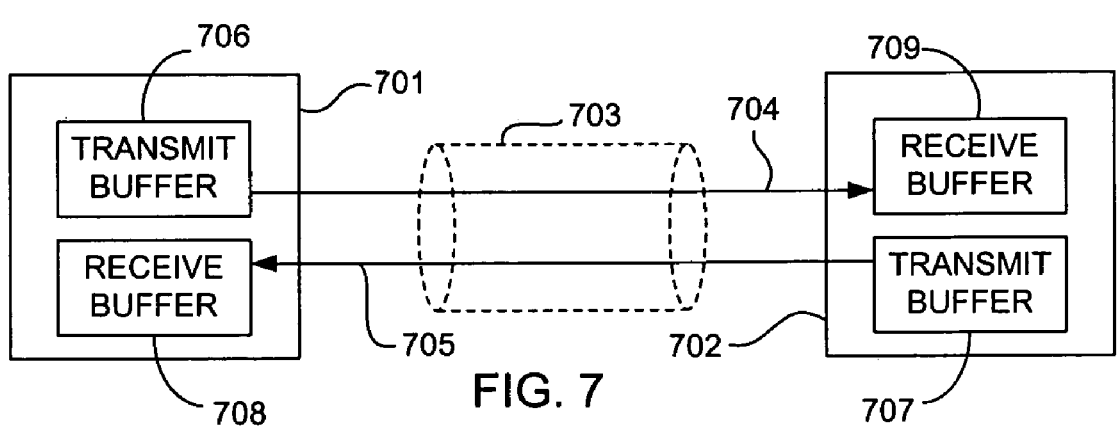
FIG. 7 is a block diagram illustrating a pair of devices coupled by a conductor in accordance with an embodiment of the invention.

FIG. 7 is a block diagram illustrating a pair of devices coupled by a conductor in accordance with an embodiment of the invention. Device 701 is coupled to device 702 via conductor 703. Devices 701 and 702 may be any of several devices coupled to a bus comprising conductor 703. Different pairs of devices may be scheduled to communicate with each other during different exchange slots on the bus. In this embodiment, device 701 includes transmit buffer 706 and receive buffer 708, and device 702 includes transmit buffer 707 and receive buffer 709. While the transmit buffers may be used as described in reference to FIG. 6, the receive buffers may be used to receive information transmitted over conductor 703 via 704 and 705, until other circuits within devices 701 and 702 are ready to process the received information. While receive buffers are illustrated in FIG. 7, it should be understood that any of the configurations illustrated in FIGS. 4, 5, and 6 may be implemented with receive buffers in either or both of the devices coupled to the conductor.

Figure 8:
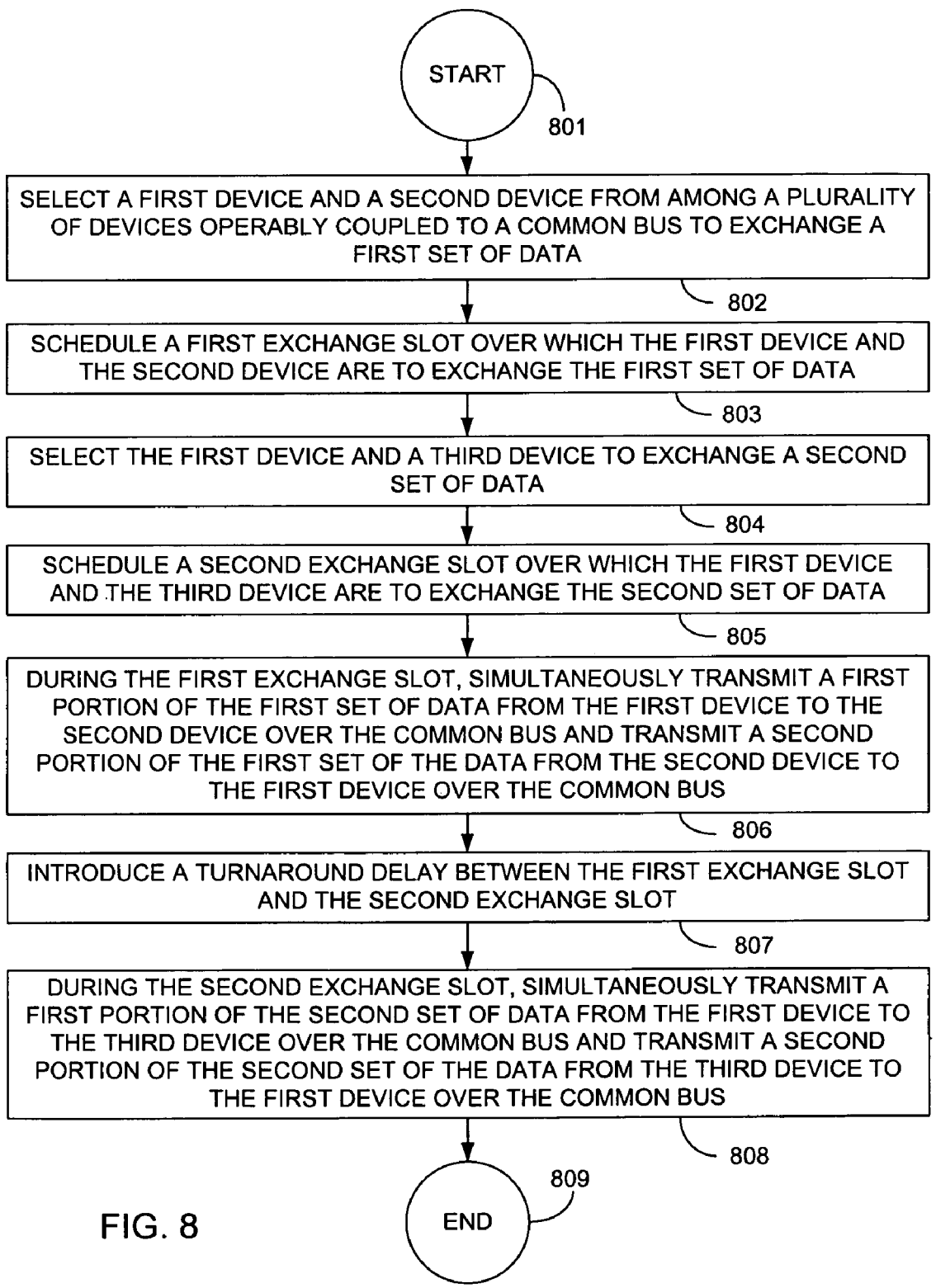
FIG. 8 is a flow diagram illustrating a process in accordance with an embodiment of the invention.

FIG. 8 is a flow diagram illustrating a process in accordance with an embodiment of the invention. The process begins in step 801. In step 802, a first device and a second device are selected from among a plurality of devices operably coupled to a common bus to exchange a first set of data. In step 803, a first exchange slot is scheduled over which a first device and a second device are to exchange the first set of data. In step 804, the first device and a third device are selected to exchange a second set of data. In step 805, a second exchange slot is scheduled over which the first device and the third device are to exchange the second set of data. In step 806, during the first exchange slot, simultaneously, a first portion of the first set of data is transmitted from the first device to the second device over the common bus and a second portion of the first set of the data is transmitted from the second device to the first device over the common bus. Current mode drivers may be used in the first device and the second device to transmit the data. Receivers with an analog subtraction function may be used in the first device and the second device to subtract or cancel out each device's own transmitted signal to yield only the signal from the other device destined for that device.

In step 807, a turnaround delay is introduced between the first exchange slot and the second exchange slot. The turnaround delay is allow signals representing the data to propagate along the bus until they are sufficiently terminated to prevent inter-symbol interference. Inter-symbol interference might occur if signals from a previous exchange slot are still present on the bus during a subsequent exchange slot. The signals from the previous exchange slot could combine with the signals from the subsequent exchange slot, thereby corrupting the data being exchanged during the subsequent exchange slot. The introduction of a turnaround delay prevents such interference.

In step 808, during a second exchange slot, simultaneously, a first portion of the second set of data is transmitted from the first device to the third device over the common bus and a second portion of the second set of data is transmitted from the third device to the first device over the common bus. Current mode drivers may be used in the first device and the third device to transmit the data. Receivers with an analog subtraction function may be used in the first device and the third device to subtract or cancel out each device's own transmitted signal to yield only the signal from the other device destined for that device. In step 809, the process ends.

Figure 9A:
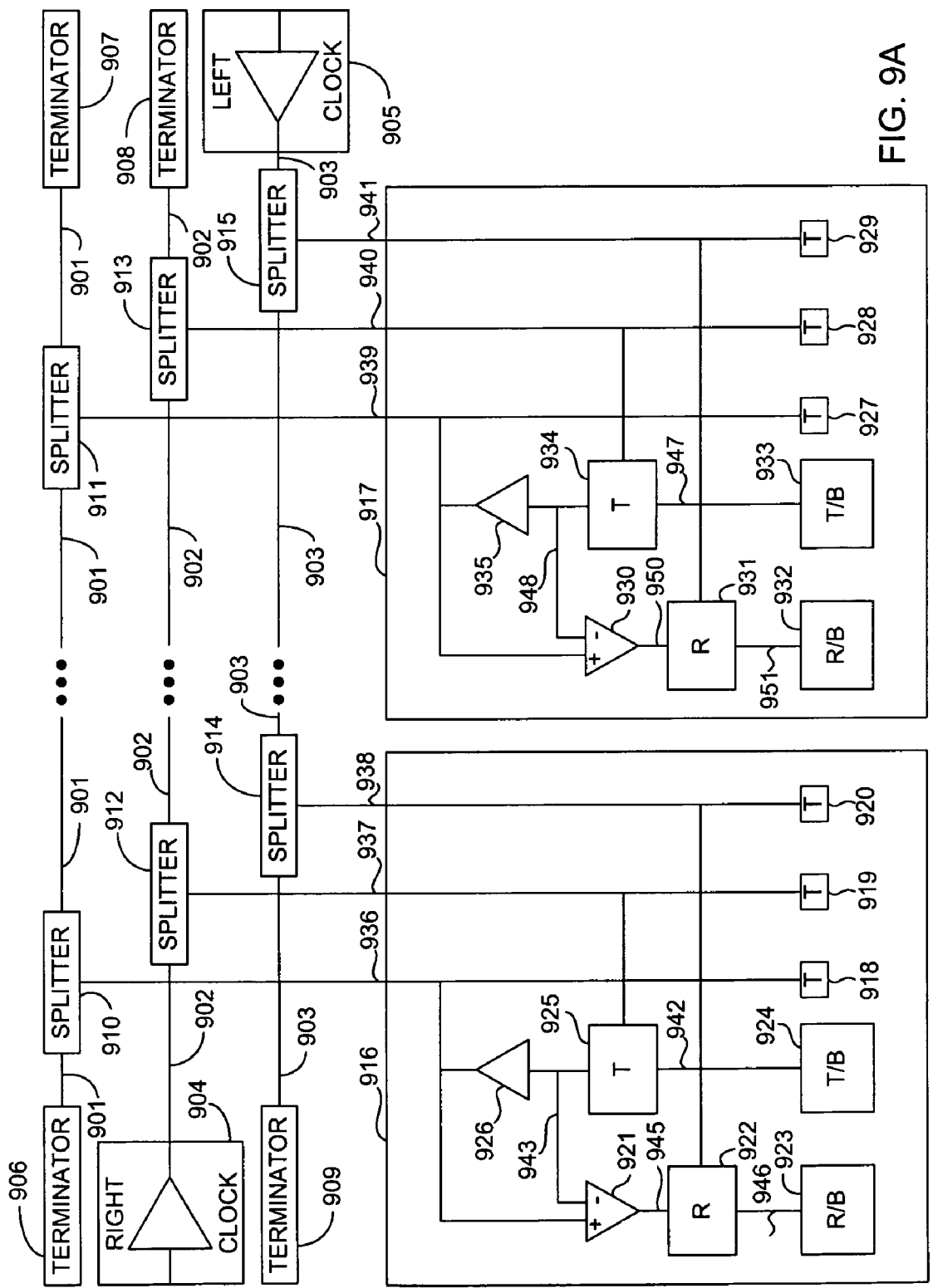
FIGS. 9A, 9B, and 9C are a diagram illustrating one embodiment of a system in accordance with the invention.
Figure 9B:
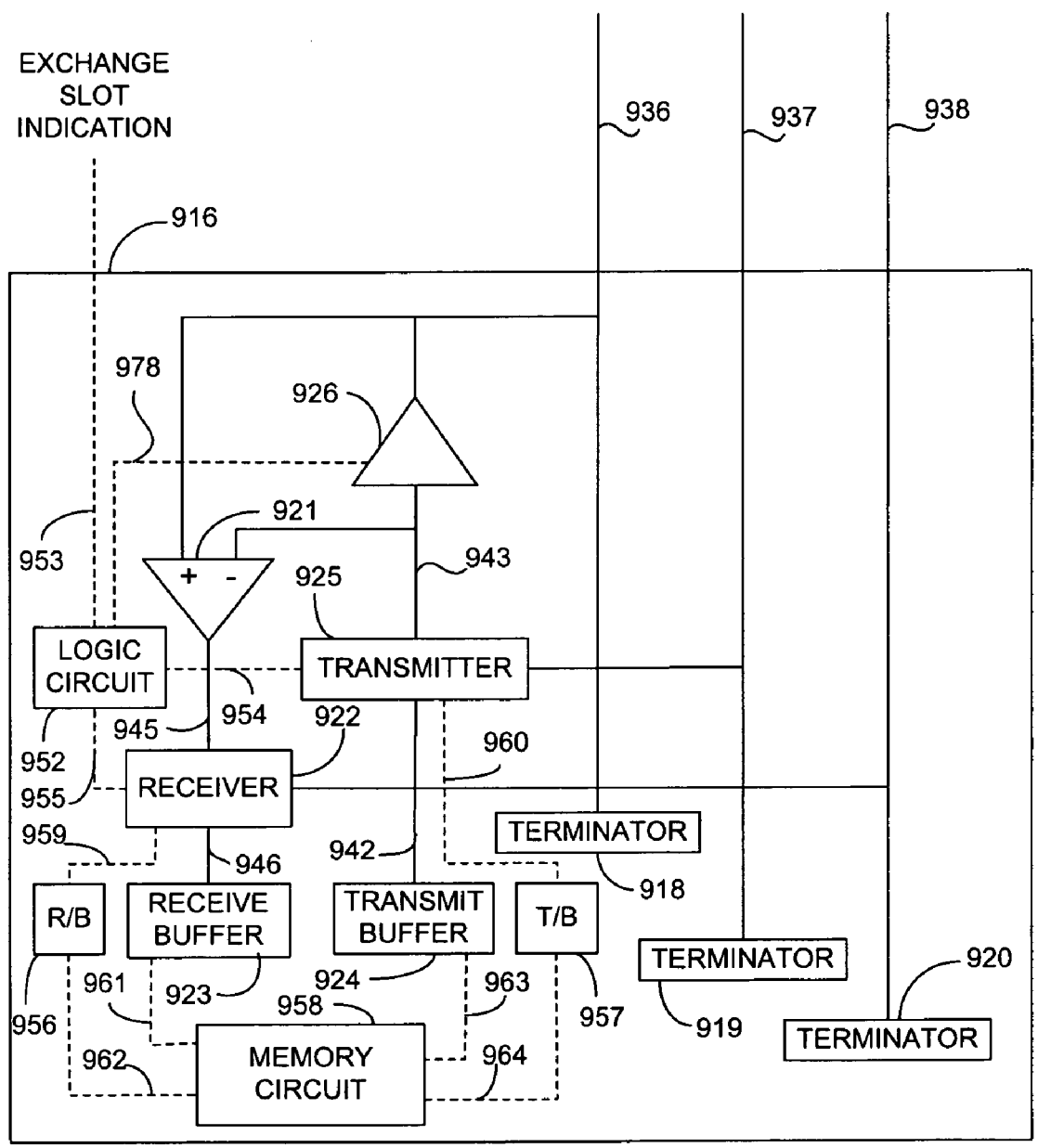
Figure 9C:
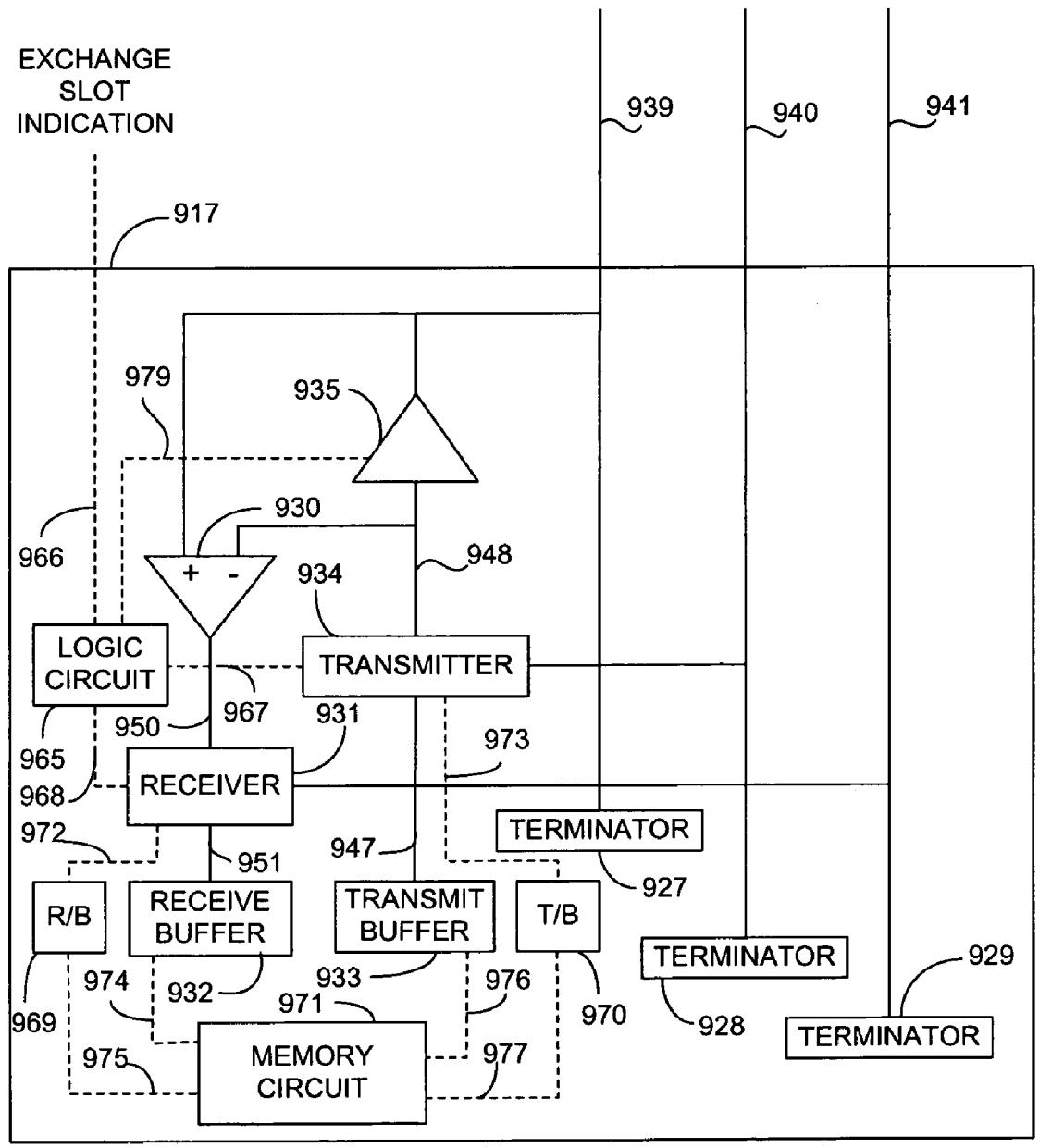

FIGS. 9A, 9B, and 9C are a diagram illustrating one embodiment of a system in accordance with the invention. As illustrated in FIG. 9A, devices 916 and 917 are coupled to a data bus 901, a clock bus 902, and clock bus 903. While only devices 916 and 917 are illustrated, it is understood that other devices may be similarly coupled to the data bus 901, the clock bus 902, and the clock bus 903. Pairs of devices coupled to these buses may be selected and scheduled to exchange information during respective exchange slots.

A terminator 906 is coupled to one end of data bus 901, and a terminator 907 is coupled to the opposite end of data bus 901. A splitter 910 is coupled to data bus 901 to allow coupling of device 916 to data bus 901 via coupling 936, which is coupled to splitter 910, while maintaining proper impedance matching for data bus 901 and coupling 936.

Splitters may be implemented using passive resistors in wye ("Y") or delta configurations, using bidirectional buffers, by providing impedance-matched motherboard traces, or using wire stubbing. Terminators may be implemented using passive resistors, active components, or by adding an open circuit (e.g., a wire stub).

A clock generator 904 is coupled to one end of clock bus 902, and a terminator 908 is coupled to the opposite end of clock bus 902. A splitter 912 is coupled to clock bus 902 to allow coupling of device 916 to clock bus 902 via coupling 937, which is coupled to splitter 912, while maintaining proper impedance matching for clock bus 902 and coupling 937.

A clock generator 905 is coupled to an end of clock bus 903 opposite the end of clock bus 902 where clock generator 904 is coupled. A terminator 909 is coupled to the end of clock bus 903 opposite the end where the clock generator 905 is coupled. A splitter 914 is coupled to clock bus 903 to allow coupling of device 916 to clock bus 903 via coupling 938, which is coupled to splitter 914, while maintaining proper impedance matching for clock bus 903 and coupling 938.

A splitter 911 is coupled to data bus 901 to allow coupling of device 917 to data bus 901 via coupling 939, which is coupled to splitter 911, while maintaining proper impedance matching for data bus 901 and coupling 939. A splitter 913 is coupled to clock bus 902 to allow coupling of device 917 to clock bus 902 via coupling 940, which is coupled to splitter 913, while maintaining proper impedance matching for clock bus 902 and coupling 940. A splitter 915 is coupled to clock bus 903 to allow coupling of device 917 to clock bus 903 via coupling 941, which is coupled to splitter 915, while maintaining proper impedance matching for clock bus 903 and coupling 941.

As illustrated in FIG. 9A and, in greater detail, in FIG. 9B, device 916 includes terminators 918, 919, and 920, transmit buffer 924, transmitter 925, driver 926, comparator 921, receiver 922, and receive buffer 923. Terminator 918 is coupled to the end of coupling 936 opposite splitter 910 to maintain proper termination of the impedance of coupling 936. Terminator 919 is coupled to the end of coupling 937 opposite splitter 912 to maintain proper termination of the impedance of coupling 937. Terminator 920 is coupled to the end of coupling 938 opposite splitter 914 to maintain proper termination of the impedance of coupling 938. Terminators 918, 919, and 920 provide controlled termination impedance.

Coupling 936 is coupled to a non-inverting input of comparator 921 and to an output of driver 926. Coupling 937 is coupled to transmitter 925. Coupling 938 is coupled to receiver 922. Transmit buffer 924 is coupled to an input of transmitter 925 via coupling 942. An output of transmitter 925 is coupled to an input of driver 926 and to an inverting input of comparator 921 via coupling 943. An output of comparator 921 is coupled to an input of receiver 922 via coupling 945. An output of receiver 922 is coupled to receive buffer 923 via coupling 946. Transmit buffer 924 and receive buffer 923 may be included or omitted in accordance with the embodiments illustrated in FIGS. 4, 5, 6, and 7. Comparator 921 is preferably implemented as a subtracting receiver that effectively subtracts the level present at coupling 943 from the level present at coupling 936 to provide an output at coupling 945, as further described in reference to FIG. 10.

Device 916 includes a transmit circuit comprising transmit buffer 924 and transmitter 925. Driver 926 may optionally be considered to be part of the transmit circuit. Device 916 also includes a receive circuit comprising comparator 921, receiver 922, and receive buffer 923.

Device 916 may include a circuit, such as logic circuit 952, responsive to an exchange slot indication 953. The circuit is coupled to transmitter 925 by coupling 954, to driver 926 by coupling 978, and to receiver 922 by coupling 955. The circuit enables the operation of a transmitter circuit including transmitter 925, a receiver circuit including receiver 922, and driver 926 during an exchange slot, allowing their interaction with the bus.

Optionally, device 916 may include a plurality of receive buffers. For example, device 916 may include a separate receive buffer for each device with which it might communicate. In addition to receive buffer 923, device 916 may include receive buffer 956. Receive buffer 956 is coupled to receiver 922 via coupling 959.

Optionally, device 916 may include a plurality of transmit buffers. For example, device 916 may include a separate transmit buffer for each device with which it might communicate. In addition to transmit buffer 924, device 916 may include transmit buffer 957. Transmit buffer 957 is coupled to transmitter 925 via coupling 960.

If device 916 is a memory device, it may include a memory circuit 958. Memory circuit 958 is coupled to receive buffer 923 via coupling 961, to receive buffer 956 via coupling 962, to transmit buffer 924 via coupling 963, and to transmit buffer 957 via coupling 964.

As illustrated in FIG. 9A and, in greater detail, in FIG. 9C, device 917 includes terminators 927, 928, and 929, transmit buffer 933, transmitter 934, driver 935, comparator 930, receiver 931, and receive buffer 932. Terminator 927 is coupled to the end of coupling 939 opposite splitter 911 to maintain proper termination of the impedance of coupling 939. Terminator 928 is coupled to the end of coupling 940 opposite splitter 913 to maintain proper termination of the impedance of coupling 940. Terminator 929 is coupled to the end of coupling 941 opposite splitter 915 to maintain proper termination of the impedance of coupling 941. Terminators 927, 928, and 929 provide controlled termination impedance.

Coupling 939 is coupled to a non-inverting input of comparator 930 and to an output of driver 935. Coupling 940 is coupled to transmitter 934. Coupling 941 is coupled to receiver 931. Transmit buffer 933 is coupled to an input of transmitter 934 via coupling 947. An output of transmitter 934 is coupled to an input of driver 935 and to an inverting input of comparator 930 via coupling 948. An output of comparator 930 is coupled to an input of receiver 931 via coupling 950. An output of receiver 931 is coupled to receive buffer 932 via coupling 951. Transmit buffer 933 and receive buffer 932 may be included or omitted in accordance with the embodiments illustrated in FIGS. 4, 5, 6, and 7. Comparator 930 is preferably implemented as a subtracting receiver that effectively subtracts the level present at coupling 948 from the level present at coupling 939 to provide an output at coupling 950, as further described in reference to FIG. 10.

Device 917 includes a transmit circuit comprising transmit buffer 933 and transmitter 934. Driver 935 may optionally be considered to be part of the transmit circuit. Device 917 also includes a receive circuit comprising comparator 930, receiver 931, and receive buffer 932.

Device 917 may include a circuit, such as logic circuit 965, responsive to an exchange slot indication 966. The circuit is coupled to transmitter 934 by coupling 967, to driver 935 by coupling 979, and to receiver 931 by coupling 968. The circuit enables the operation of a transmitter circuit including transmitter 934, a receiver circuit including receiver 931, and driver 935 during an exchange slot, allowing their interaction with the bus.

Optionally, device 917 may include a plurality of receive buffers. For example, device 917 may include a separate receive buffer for each device with which it might communicate. In addition to receive buffer 932, device 917 may include receive buffer 969. Receive buffer 969 is coupled to receiver 931 via coupling 972.

Optionally, device 917 may include a plurality of transmit buffers. For example, device 917 may include a separate transmit buffer for each device with which it might communicate. In addition to transmit buffer 933, device 917 may include transmit buffer 970. Transmit buffer 970 is coupled to transmitter 934 via coupling 973.

If device 917 is a memory device, it may include a memory circuit 971. Memory circuit 971 is coupled to receive buffer 932 via coupling 974, to receive buffer 969 via coupling 975, to transmit buffer 933 via coupling 976, and to transmit buffer 970 via coupling 977.

The clock signal generated by clock generator 904 is used to control the timing of transmitter 925 in device 916 and transmitter 934 in device 917. The clock signal generated by clock generator 905 is used to control the timing of receiver 922 in device 916 and receiver 931 in device 917.

When device 916 is scheduled for an exchange slot with another device, for example, device 917, data in transmit buffer 924 is passed to transmitter 925 via coupling 942. Transmitter 925 transmits the data through coupling 943 and driver 926 to coupling 936. The data is coupled through splitter 910 to data bus 901, where it propagates to splitter 911, which is coupled to device 917. Splitter 911 couples the data to coupling 939, which couples the data to the non-inverting input of comparator 930 of device 917.

At the same time, data in transmit buffer 933 of device 917 is passed to an input of transmitter 934 via coupling 947. Transmitter 934 transmits the data through coupling 947 and driver 935 to coupling 939. The data is coupled through splitter 911 to data bus 901, where it propagates to splitter 910, which is coupled to device 916. Transmitter 934 also provides the data to the inverting input of comparator 930. Comparator 930 effectively subtracts the signal representing the data from transmitter 934 of device 917 from the signal present on data bus 901, yielding a signal representing the data from transmitter 925 of device 916. Consequently, while both the data from transmitter 925 of device 916 and the data from transmitter 934 of device 917 are present on data bus 901 and couplings 936 and 939, the data from transmitter 925 of device 916 is present at coupling 950 without interference from the data from transmitter 934 of device 917. The data from transmitter 925 of device 916 are received at receiver 931 of device 917 and passed to receive buffer 932 of device 917 via coupling 951.

Likewise, in device 916, as data from transmitter 934 of device 917 is coupled from data bus 901 to coupling 936 via splitter 910, comparator 921 of device 916 effectively subtracts the signal representing the data from transmitter 925 of device 916 from the signal present on data bus 901, yielding a signal representing the data from transmitter 934 of device 917. Consequently, while both the data from transmitter 925 of device 916 and the data from transmitter 934 of device 917 are present on data bus 901 and couplings 936 and 939, the data from transmitter 934 of device 917 is present at coupling 945 without interference from the data from transmitter 925 of device 916. The data from transmitter 934 of device 917 are received at receiver 922 of device 916 and passed to the receive buffer 923 of device 916 via coupling 946.

In one embodiment of the invention, the system illustrated in FIGS. 9A, 9B, and 9C may be implemented as a memory system comprising a memory controller and memory devices. In that case, the transmit buffer of a memory controller may be referred to as a write buffer, and the receive buffer of a memory controller may be referred to as a read buffer. Likewise, the transmit buffer of a memory device may be referred to as a read buffer, and the receive buffer of a memory device may be referred to as a write buffer.

Figure 10:
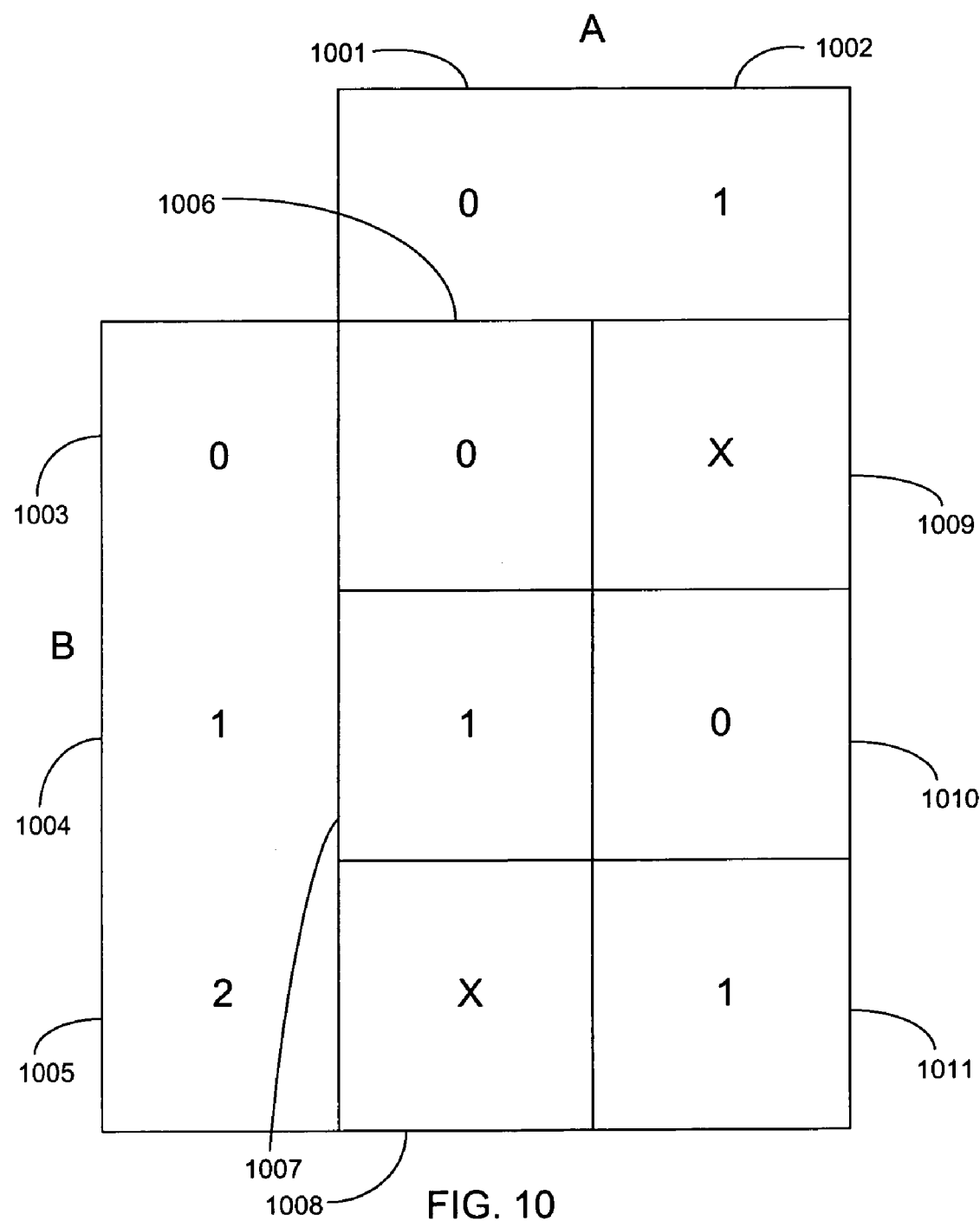
FIG. 10 is a truth table diagram illustrating the values of data present at coupling 945 for device 916 or coupling 950 for device 917 of FIGS. 9A, 9B, and 9C, based on the values of data present at couplings 943 and 936 for device 916 or 948 and 939 for device 917, respectively.

FIG. 10 is a truth table diagram illustrating the values of data present at coupling 945 for device 916 or coupling 950 for device 917 of FIGS. 9A, 9B, and 9C, based on the values of data present at couplings 943 and 936 for device 916 or 948 and 939 for device 917, respectively. Column 1001 corresponds to a level representing a logical zero present at coupling 943 or coupling 948. Column 1002 corresponds to a level representing a logical one present at coupling 943 or coupling 948. Row 1003 corresponds to a level representing a logical zero at coupling 936 or coupling 939. Row 1004 corresponds to a level representing a logical one at coupling 936 or coupling 939. Row 1005 corresponds to a level representing a logical two at coupling 936 or coupling 939.

Entry 1006 indicates that a level corresponding to a logical zero will be present at coupling 945 or 950 when a level corresponding to a logical zero is present at coupling 943 or 948 and a level corresponding to a logical zero is present at coupling 936 or 939, respectively. Entry 1007 indicates that a level corresponding to a logical one will be present at coupling 945 or 950 when a level corresponding to a logical zero is present at coupling 943 or 948 and a level corresponding to a logical one is present at coupling 936 or 939, respectively. Entry 1008 indicates that the state where a level corresponding to a logical zero is present at coupling 943 or 948 and a level corresponding to a logical two is present at coupling 936 or 939, respectively, does not occur.

Entry 1009 indicates that a state where a level corresponding to a logical one is present at coupling 943 or 948 and level corresponding to a logical zero is present at coupling 936 or 939, respectively, does not occur. Entry 1010 indicates that a level corresponding to a logical zero will be present at coupling 945 or 950 when a level corresponding to a logical one is present at coupling 943 or 948 and a level corresponding to a logical one is present at coupling 936 or 939, respectively. Entry 1011 indicates that a level corresponding to a logical one will be present at coupling 945 or 950 when a level corresponding to a logical one is present at coupling 943 or 948 and a level corresponding to a logical two is present at coupling 936 or 939, respectively.

Figure 11:
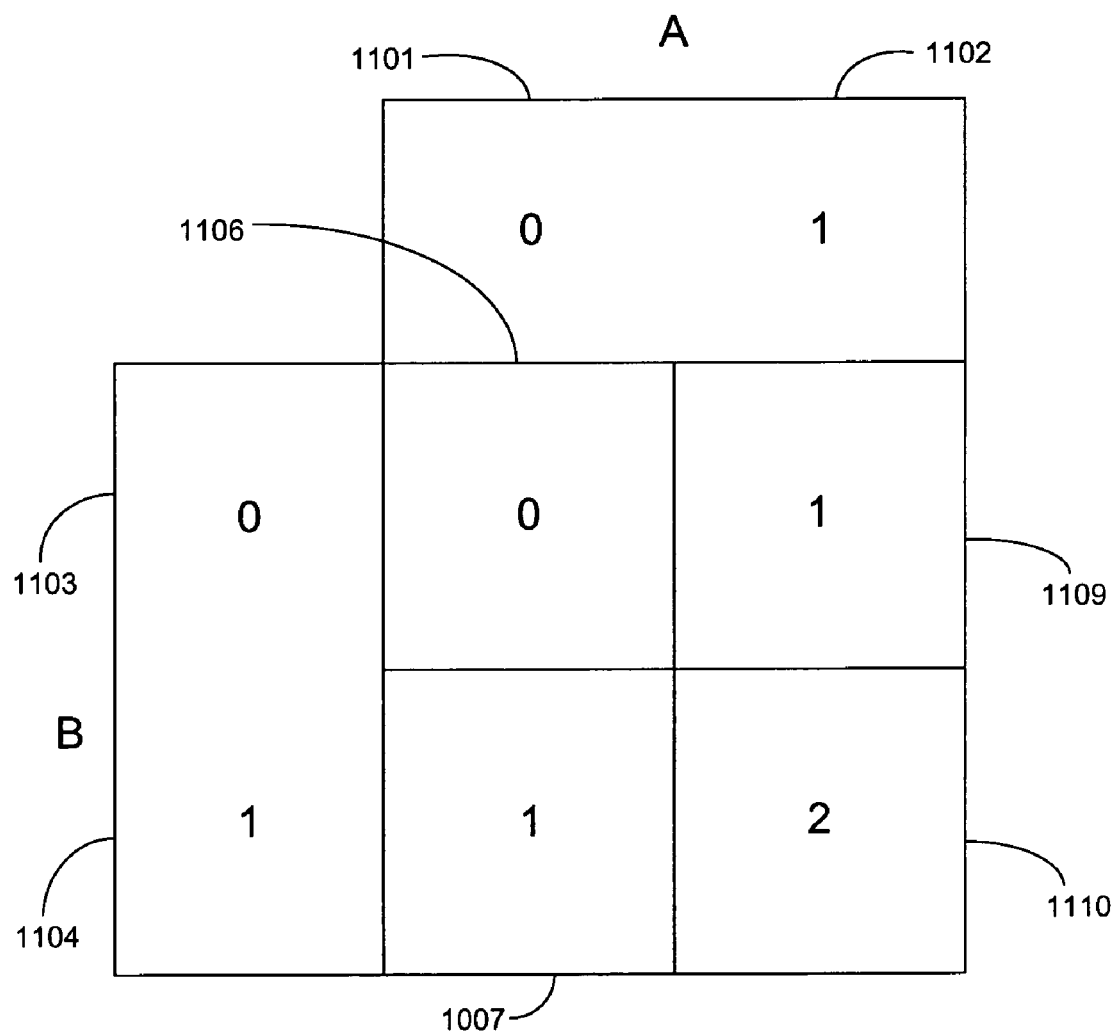
FIG. 11 is a truth table diagram illustrating the values of data present at coupling 936 for device 916 or coupling 939 for device 917 of FIGS. 9A, 9B, and 9C, based on the values of data present at coupling 943 for device 916 and coupling 948 for device 917.

FIG. 11 is a truth table diagram illustrating the values of data present at coupling 936 for device 916 or coupling 939 for device 917 of FIGS. 9A, 9B, and 9C, based on the values of data present at coupling 943 for device 916 and coupling 948 for device 917. Column 1101 corresponds to a level representing a logical zero present at coupling 943. Column 1102 corresponds to a level representing a logical one present at coupling 943. Row 1103 corresponds to a level representing a logical zero present at coupling 948. Row 1104 corresponds to a level representing a logical one present at coupling 948.

Entry 1106 indicates that a level having a relative amplitude of zero will be present at coupling 936 for device 916 or coupling 939 for device 917 when a level corresponding to a logical zero is present at coupling 943 and a level corresponding to a logical zero is present at coupling 948. Entry 1107 indicates that a level having a relative amplitude of one will be present at coupling 936 for device 916 or coupling 939 for device 917 when a level corresponding to a logical zero is present at coupling 943 and a level corresponding to a logical one is present at coupling 948. Entry 1109 indicates that a level having a relative amplitude of one will be present at coupling 936 for device 916 or coupling 939 for device 917 when a level corresponding to a logical one is present at coupling 943 and a level corresponding to a logical zero is present at coupling 948. Entry 1110 indicates that a level having a relative amplitude of two will be present at coupling 936 for device 916 or coupling 939 for device 917 when a level corresponding to a logical one is present at coupling 943 and a level corresponding to a logical one is present at coupling 948.

This truth table diagram reflects steady state, DC signal values. In practice, there is a propagation delay between coupling 936 of device 916 and coupling 939 of device 917. There are also propagation delays between couplings 943 and 936 through driver 926 of device 916 and between couplings 948 and 939 through driver 935 of device 917. The levels described above will appear at the indicated couplings after the respective propagation delays have occurred. It should also be noted that the levels represent logical values and that the mapping of logical values to physical values (e.g., voltage and/or current levels) is provided by the drivers and receiver circuits.

Figure 12:
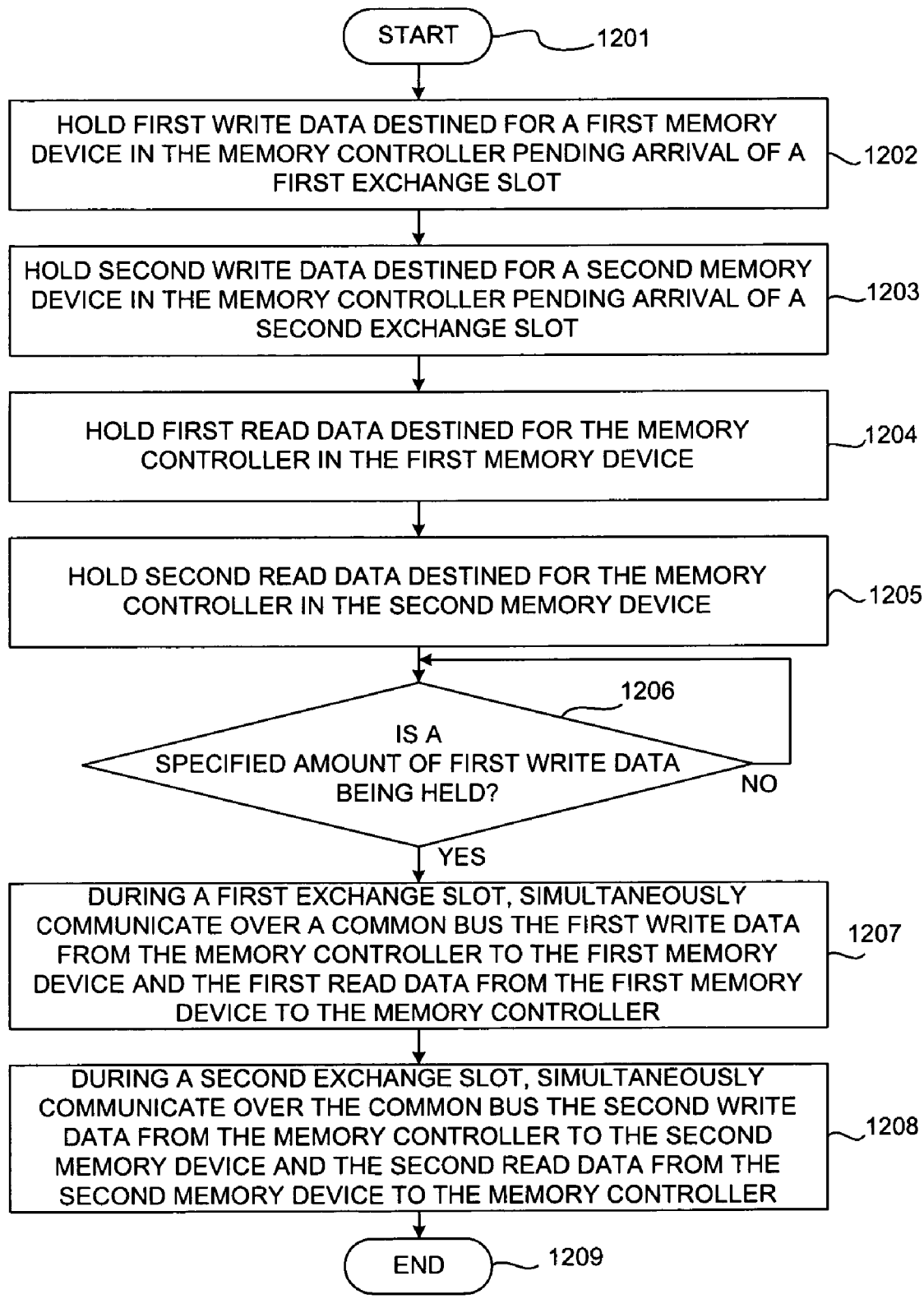
FIG. 12 is a flow diagram illustrating a process for providing simultaneous bidirectional communication between a memory controller and a plurality of memory devices in accordance with an embodiment of the invention.

FIG. 12 is a flow diagram illustrating a process for providing simultaneous bidirectional communication between a memory controller and a plurality of memory devices in accordance with an embodiment of the invention. The process begins in step 1201. In step 1202, first write data destined for a first memory device is held in a memory controller pending arrival of a first exchange slot. In step 1203, second write data destined for a second memory device is held in the memory controller pending arrival of a second exchange slot. In step 1204, first read data destined for the memory controller is held in the first memory device. In step 1205, second read data destined for the memory controller is held in the second memory device. In step 1206, a decision is made as to whether or not a specified amount of first write data is being held in the memory controller. In step 1207, during a first exchange slot, the first write data is communicated from the memory controller to the first memory device and the first read data is communicated from the first memory device to the memory controller simultaneously. In step 1208, during a second exchange slot, the second write data is communicated from the memory controller to the second memory device and the second read data is communicated from the second memory device to the memory controller simultaneously. In step 1209, the process ends.

Figure 13:
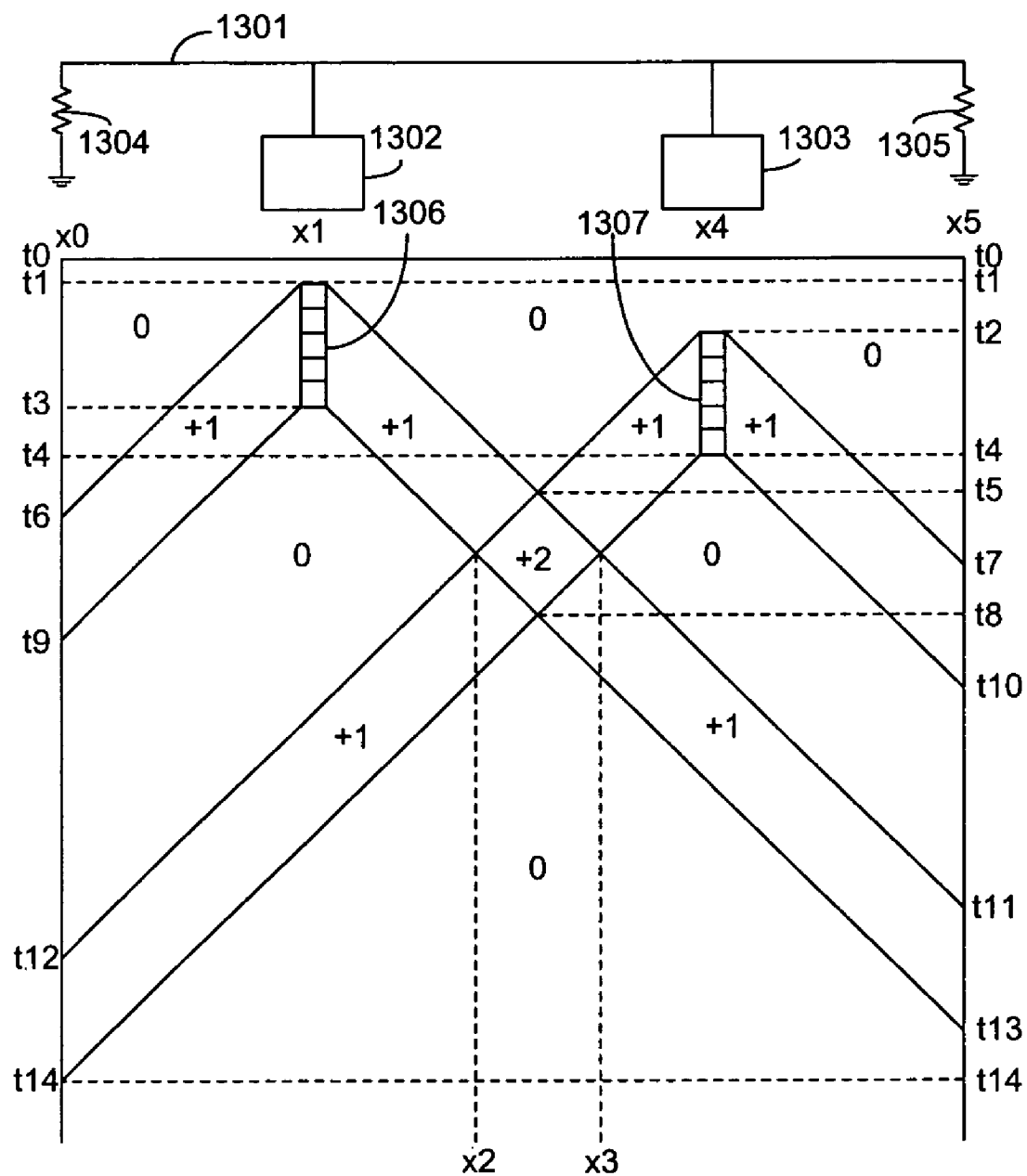
FIG. 13 is a lattice diagram illustrating propagation over time of signals on a bus.

FIG. 13 is a lattice diagram illustrating propagation over time of signals on a bus. Device 1302 is coupled to bus 1301 at location x1. Device 1303 is coupled to bus 1301 at location x4. Terminator 1304 is coupled to bus 1301 at location x0. Terminator 1305 is coupled to bus 1301 at location x5.

The time illustrated on the lattice diagram begins at time t0. Between time t1 and time t3, device 1302 transmits data onto the bus in the form of signal 1306. Between time t2 and time t4, device 1303 transmits data onto the bus in the form of signal 1307. If the prevalent level present on the bus prior to the transmissions of devices 1302 and 1303 was zero, and if the signals 1306 and 1307 have levels of zero or one, the maximum level propagating along the bus 1301 away from locations x1 and x4 is one.

Wavefronts corresponding to signal 1306 propagate in both directions along bus 1301 away from location x1. Wavefronts corresponding to signal 1307 propagate in both directions along bus 1301 away from location x4. Between time t6 and time t9, the wavefront corresponding to signal 1306 propagating toward terminator 1304 reaches terminator 1304 and disappears from bus 1301. Between time t7 and time t10, the wavefront corresponding to signal 1307 propagating toward terminator 1305 reaches terminator 1305 and disappears from bus 1301.

However, between time t5 and time t8, the wavefront from signal 1306 propagating toward terminator 1305 and the wavefront from signal 1307 propagating toward terminator 1304 pass each other between locations x2 and x3 as they propagate along the bus 1301. The wavefronts have an additive influence on the levels present in the region of the bus 1301 where they pass each other. Thus, the maximum level present where the wavefronts pass each other is two, based on the additive influence of the two wavefronts that each have a maximum level of one.

After the wavefronts corresponding to signals 1306 and 1307 finish passing each other on the bus 1301, they continue to propagate along bus 1301, each resulting in a maximum level of one along the portion of the bus 1301 where they are propagating. Between time t11 and time t13, the wavefront corresponding to signal 1306 propagating toward terminator 1305 reaches terminator 1305 at location x5, and the wavefront disappears from the bus 1301. Between time t12 and time t14, the wavefront corresponding to signal 1307 propagating toward terminator 1304 reaches terminator 1304, and the wavefront disappears from the bus 1301. Once these wavefronts have disappeared from the bus, the maximum level present on the bus 1301 is zero. Thus, the bus 1301 is clear to accept signals from another pair of devices in another exchange slot.

Once devices 1302 and 1303 finish transmitting their respective signals (e.g., at time t4), a turnaround delay is introduced to allow the signals to disappear from bus 1301. As an example, the turnaround delay may begin at time t4 and end at time t14. After time t14, the all wavefronts corresponding to both signal 1306 and signal 1307 have propagated to terminators and have disappeared from bus 1301. Thus, new signals introduced onto bus 1301 (for example, by another pair of devices exchanging data in another exchange slot), after time t14 will not suffer interference from signals 1306 or 1307 or their corresponding wavefronts.

While signals 1306 and 1307 are illustrated as not being perfectly aligned in time (i.e., with signal 1306 being introduced onto bus 1301 from time t1 to time t3 and signal 1307 being introduced onto bus 1301 from time t2 to time t4), and the invention may certainly be practiced in this manner, bus efficiency may be optimized by aligning the signals from different devices as closely in time as possible and/or by beginning transmission of both signals as near to the beginning of their exchange slot as possible. For example, if signals 1306 and 1307 are transmitted in an exchange slot beginning at time t1 and ending at time t4 when they are not aligned, the exchange slot may be shortened to the period from time t1 to time t3 if the signals 1306 and 1307 are perfectly aligned and the transmission of both signals begins at time t1.

Accordingly, a method and apparatus for simultaneous bidirectional signaling in a bus topology has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing simultaneous bidirectional signaling in a bus topology comprising the steps of:
   selecting a first memory device and a second memory device from among a plurality of memory devices coupled to a common bus line to exchange a first set of data;
   scheduling a first exchange slot over which the first memory device and the second memory device are to exchange the first set of data; and
   during the first exchange slot, simultaneously transmitting a first portion of the first set of data from the first memory device to the second memory device over the common bus line and transmitting a second portion of the first set of the data from the second device to the first device over the common bus line.

2. The method of claim 1 further comprising the steps of:
   selecting the first memory device and a third memory device to exchange a second set of data;
   scheduling a second exchange slot over which the first memory device and the third memory device are to exchange the second set of data; and
   during the second exchange slot, simultaneously transmitting a first portion of the second set of data from the first memory device to the third memory device over the common bus line and transmitting a second portion of the second set of the data from the third memory device to the first memory device over the common bus line.

3. The method of claim 2 further comprising the step of:
   introducing a turnaround delay between the first exchange slot and the second exchange slot.

4. The method of claim 3 wherein the turnaround delay is less than twice an end-to-end propagation delay of the common bus line.

5. The method of claim 1 wherein the first memory device is a memory controller device, and the second memory device is a memory storage device and wherein the first portion of the first set of data and the first portion of the second set of data are write data and the second portion of the first set of data and the second portion of the second set of data are read data.

6. A system for providing simultaneous bidirectional signaling in a bus topology, the system comprising:
   a first memory device coupled to a bus line;
   a second memory device coupled to the bus line, the first memory device transmitting a first portion of a first set of data over the bus line to the second memory device and the second memory device transmitting a second portion of the first set of data over the bus line to the first memory device simultaneously during a first exchange slot; and
   a third memory device coupled to the bus line, the first memory device transmitting a first portion of a second set of data over the bus line to the third memory device and the third memory device transmitting a second portion of the second set of data over the bus line to the first memory device simultaneously during a second exchange slot.

7. The system of claim 6 wherein a turnaround delay exists between the first exchange slot and the second exchange slot.

8. The system of claim 7 wherein the turnaround delay is less than twice an end-to-end propagation delay associated with the bus line.

9. The system of claim 6 wherein the first memory device is a memory controller device, and the second memory device is a memory storage device and wherein the first portion of the first set of data and the first portion of the second set of data are write data and the second portion of the first set of data and the second portion of the second set of data are read data.

10. A memory device coupled to a bus line in a bus topology for providing simultaneous bidirectional signaling, the memory device comprising:
    a transmitter circuit configured to provide additive signaling, the transmitter circuit applying transmit signals to the bus line;
    a receiver circuit operably coupled to the transmitter circuit, the receiver circuit configured to effectively subtract the transmit signals to receive received signals from the bus line, the transmitter circuit and the receiver circuit operating during an exchange slot.

11. The memory device of claim 10 wherein the memory device is coupled to the bus line by an impedance-matching splitter.

12. The memory device of claim 10 wherein the memory device further comprises:
    a terminator operably coupled to the transmitter circuit and the receiver circuit, the terminator providing a controlled termination impedance.

13. The memory device of claim 10 wherein the transmitter circuit further comprises:
    a driver operably coupled to the bus line, the driver configured to apply the transmit signals to the bus line using additive signaling; and
    a transmitter operably coupled to the driver, the transmitter providing the transmit signals to the driver.

14. The memory device of claim 13 wherein the transmitter circuit further comprises:
    a plurality of transmit buffers operably coupled to the transmitter, the plurality of transmit buffers configured to hold data destined for different other memory devices.

15. The memory device of claim 13 wherein the receiver circuit further comprises:
    a comparator operably coupled to the transmitter, the driver, and the bus line, the comparator configured to effectively subtract the transmit signals to yield received signals from the bus line; and
    a receiver operably coupled to the comparator, the receiver receiving the received signals and obtaining received data from the received signals.

16. The memory device of claim 15 further comprising:
    an enabling circuit, coupled to the transmit circuit and the receive circuit, responsive to an exchange slot indication, the enabling circuit enabling the operation of the transmit circuit and the receive circuit during the exchange slot.

17. A memory system comprising:
    a memory controller;
    a bus line coupled to the memory controller;
    a first memory device coupled to the bus line, the first memory device configured to simultaneously send first read data to the memory controller via the bus line and receive first write data from the memory controller via the bus line; and
    a second memory device coupled to the bus line, the second memory device configured to simultaneously send second read data to the memory controller via the bus line and receive second write data from the memory controller via the bus line.

18. The memory system of claim 17 wherein the first memory device is configured to simultaneously send the first read data to the memory controller and receive the first write data from the memory controller during a first exchange slot and wherein the second memory device is configured to simultaneously send the second read data to the memory controller and receive the second write data from the memory controller during a second exchange slot.

19. The memory system of claim 18 wherein the memory controller comprises:
 a first write buffer to hold the first write data pending arrival of the first exchange slot.

20. The memory system of claim 19 wherein the memory controller comprises:
 a second write buffer to hold the second write data pending arrival of the second exchange slot.

21. The memory system of claim 17 wherein the bus line comprises:
 a conductor coupling the first memory device and the second memory device to the memory controller, wherein the first memory device is configured to simultaneously send a first read bit of the first read data to the memory controller over the conductor and receive a first write bit of the first write data from the memory controller over the conductor during a first exchange slot and wherein the second memory device is configured to simultaneously send a second read bit of the second read data to the memory controller over the conductor and receive a second write bit of the second write data from the memory controller over the conductor during a second exchange slot.

22. The memory system of claim 21 wherein a turnaround delay sufficient to prevent inter-symbol interference is introduced between the first exchange slot and the second exchange slot.

23. The memory system of claim 17 wherein the memory controller performs coherency checking during memory access operations.

24. A memory device comprising:
 a transmitter circuit configured to drive a bus line with read data during an exchange slot while write data is present on the bus line;
 a receiver circuit operably coupled to the transmitter circuit, the receiver circuit configured to receive the write data from the bus line during the exchange slot while the transmitter circuit is driving the bus line with the read data; and
 a memory circuit operably coupled to the transmitter circuit and the receiver circuit, the memory circuit configured to provide the read data and to store the write data.

25. The memory device of claim 24 further comprising:
 an enabling circuit responsive to an exchange slot indication, the enabling circuit operably coupled to the transmitter circuit and the receiver circuit, the enabling circuit enabling interaction of the transmitter circuit and the receiver circuit with the bus line during the exchange slot.

26. The memory device of claim 25 wherein the enabling circuit is configured to be responsive to the exchange slot indication following a turnaround delay sufficient to prevent inter-symbol interference.

27. The memory device of claim 24 wherein the transmitter circuit further comprises:
 a driver operably coupled to the bus line, the driver configured to drive the bus lines with the read data using additive signaling;
 a transmitter operably coupled to the driver, the transmitter providing the read data to the driver; and
 a transmit buffer operably coupled to the transmitter, the transmit buffer holding the read data pending arrival of the exchange slot.

28. A memory controller comprising:
 a transmitter circuit configured to drive a bus line with first write data destined for a first memory device during a first exchange slot while first read data from the first memory device is present on the bus line; and
 a receiver circuit operably coupled to the transmitter circuit, the receiver circuit configured to receive the first read data from the bus line during the first exchange slot while the transmitter circuit is driving the bus line with the first write data.

29. The memory controller of claim 28 wherein the transmitter circuit is further configured to drive the bus line with second write data destined for a second memory device during a second exchange slot while second read data from the second memory device is present on the bus line and wherein the receiver circuit is further configured to receive the second read data from the bus line during the second exchange slot while the transmitter circuit is driving the bus line with the second write data.

30. The memory controller of claim 29 wherein a turnaround delay sufficient to prevent inter-symbol interference is introduced between the first exchange slot and the second exchange slot.

31. The memory controller of claim 28 wherein the transmitter circuit further comprises:
 a driver operably coupled to the bus line, the driver configured to drive the bus line with the first write data using additive signaling; and
 a transmitter operably coupled to the driver to transmit the first write data to the driver.

32. The memory controller of claim 31 wherein the transmitter circuit further comprises:
 a first transmit buffer to hold the first write data pending arrival of the first exchange slot; and
 a second transmit buffer to hold the second write data pending arrival of the second exchange slot.

33. A method for providing simultaneous bidirectional communication between a memory controller and a plurality of memory devices comprising the steps of:
 during a first exchange slot, simultaneously communicating over a common bus line first write data from the memory controller to a first memory device of the plurality of memory devices and first read data from the first memory device to the memory controller; and
 during a second exchange slot, simultaneously communicating over the common bus line second write data from the memory controller to a second memory device of the plurality of memory devices and second read data from the second memory device to the memory controller.

34. The method of claim 33 further comprising the step of:
 holding the first write data destined for the first memory device in the memory controller pending arrival of the first exchange slot.

35. The method of claim 34 further comprising the step of:
 holding the second write data destined for the second memory device in the memory controller pending arrival of the second exchange slot.

36. The method of claim 35 wherein the step of holding the first write data occurs in a first write buffer and wherein the step of holding the second write data occurs in a second write buffer.

37. The method of claim 35 further comprising the steps of:
 holding the first read data destined for the memory controller in the first memory device; and
 holding the second read data destined for the memory controller in the second memory device.

38. The method of claim 37 wherein the step of simultaneously communicating over the common bus line the first write data from the memory controller to the first memory device and the first read data from the first memory device to the memory controller occurs after a specified amount of the first write data destined for the first memory device is held in the memory controller.

39. A system for bidirectional communication of data over a common bus line comprising:
- a first device operably coupled to the common bus line, the first device comprising a first-to-second transmit buffer to hold first-to-second data and a first-to-third transmit buffer to hold first-to-third data;
- a second device operably coupled to the common bus line, the second device comprising a second-to-first transmit buffer to hold second-to-first data;
- a third device operably coupled to the common bus line, the third device comprising a third-to-first transmit buffer to hold third-to-first data; and
- a scheduler operably coupled to the common bus line, the scheduler scheduling the first device to transmit the first-to-second data and the second device to transmit the second-to-first data over the common bus line simultaneously during a first exchange slot and scheduling the first device to transmit the first-to-third data and the third device to transmit the third-to-first data over the common bus line simultaneously during a second exchange slot, the scheduler introducing a turn-around delay sufficient to prevent inter-symbol interferences between the first exchange slot and the second exchange slot.

* * * * *